(12) United States Patent
Matson

(10) Patent No.: US 10,289,195 B2
(45) Date of Patent: May 14, 2019

(54) IMMERSIVE DEVICE

(71) Applicant: Kaleb Matson, Lynchburg, VA (US)

(72) Inventor: Kaleb Matson, Lynchburg, VA (US)

(73) Assignee: Lux Art & Company, Denver, CO (US)

( * ) Notice: Subject to any disclaimer, the term of this patent is extended or adjusted under 35 U.S.C. 154(b) by 0 days.

(21) Appl. No.: 16/052,748

(22) Filed: Aug. 2, 2018

(65) Prior Publication Data

US 2018/0348855 A1    Dec. 6, 2018

Related U.S. Application Data

(63) Continuation-in-part of application No. 15/867,619, filed on Jan. 10, 2018, which is a continuation-in-part of application No. 15/454,121, filed on Mar. 9, 2017, now abandoned.

(51) Int. Cl.
*G06F 3/01* (2006.01)
*G02B 17/06* (2006.01)

(52) U.S. Cl.
CPC .............. *G06F 3/011* (2013.01); *G02B 17/06* (2013.01); *G06F 2203/012* (2013.01)

(58) Field of Classification Search
CPC .... G06F 3/011; G06F 2203/012; G02B 17/06
See application file for complete search history.

(56) References Cited

U.S. PATENT DOCUMENTS

| 656,927 | A | | 8/1900 | Biver et al. |
| 1,422,685 | A | | 7/1922 | Lee |
| 2,273,604 | A | | 2/1942 | Vetter |
| 3,858,377 | A | * | 1/1975 | Browne ................ E04B 1/6116 52/463 |
| 4,050,790 | A | | 9/1977 | Jorwa |
| 4,268,121 | A | | 5/1981 | Peskin |
| 4,775,231 | A | | 10/1988 | Granzow et al. |
| 4,882,795 | A | | 11/1989 | Baus |

(Continued)

OTHER PUBLICATIONS

FIBERCORE by Fiber-Tech Product Literature (Year: 2012).*

(Continued)

*Primary Examiner* — James M Ference
(74) *Attorney, Agent, or Firm* — Patentfile, LLC; Bradley C. Fach; Steven R. Kick

(57) ABSTRACT

An immersive device may include a floor sidewall having a floor reflective surface. A first sidewall, having a first wall reflective surface, may be coupled to the floor sidewall. A second sidewall, having a second wall reflective surface, may be coupled to the floor sidewall and coupled to the first sidewall. A third sidewall, having a third wall reflective surface, may be coupled to the floor sidewall opposite the first sidewall and coupled to the second sidewall. A fourth sidewall, having a fourth wall reflective surface, may be coupled to the floor sidewall opposite the second sidewall and coupled to both the first sidewall and third sidewall. A ceiling sidewall, having a ceiling reflective surface, may be coupled to the first, second, third, and fourth sidewalls, and the ceiling sidewall may be positioned opposite to the floor sidewall. The floor reflective surface, wall reflective surfaces, and ceiling reflective surface may form a perimeter of and bound the reflective chamber.

19 Claims, 12 Drawing Sheets

(56) References Cited

U.S. PATENT DOCUMENTS

| | | | |
|---|---|---|---|
| 4,964,252 A * | 10/1990 | Guliker | E04H 1/1238 220/1.5 |
| 5,191,743 A * | 3/1993 | Gailey | E04B 9/30 52/288.1 |
| 5,443,260 A | 8/1995 | Stewart et al. | |
| 7,018,084 B2 | 3/2006 | Gotfried | |
| 7,131,761 B2 | 11/2006 | Pipo et al. | |
| 7,198,396 B2 | 4/2007 | Isaacson | |
| 7,352,951 B2 | 4/2008 | Gotfried | |
| 7,540,644 B1 | 6/2009 | Allen | |
| 8,029,368 B2 | 10/2011 | Novis | |
| 8,087,810 B2 | 1/2012 | Isaacson | |
| 8,595,999 B1 * | 12/2013 | Pilz | E04B 1/943 52/232 |
| 9,449,446 B1 | 9/2016 | Mullin et al. | |
| 2002/0097978 A1 | 7/2002 | Lowry et al. | |
| 2004/0160199 A1 | 8/2004 | Morgan et al. | |
| 2005/0063194 A1 | 3/2005 | Lys et al. | |
| 2007/0188427 A1 | 8/2007 | Lys et al. | |
| 2007/0265070 A1 | 11/2007 | Zeimkowski et al. | |
| 2008/0062713 A1 | 3/2008 | Dwyer et al. | |
| 2010/0066978 A1 | 3/2010 | Powell et al. | |
| 2011/0075284 A1 | 3/2011 | Brandon | |
| 2011/0076024 A1 | 3/2011 | Damink | |
| 2011/0303906 A1 | 12/2011 | Goldmann | |
| 2012/0070883 A1 | 3/2012 | Ward et al. | |
| 2012/0079555 A1 * | 3/2012 | Choi | G09B 19/0015 725/139 |
| 2013/0016438 A1 | 1/2013 | Billiot | |
| 2013/0186020 A1 * | 7/2013 | Pilz | E04B 2/7411 52/232 |
| 2014/0075865 A1 * | 3/2014 | Pilz | E04B 2/7411 52/232 |
| 2015/0144046 A1 | 5/2015 | Koestner | |
| 2016/0097197 A1 * | 4/2016 | Pilz | E04B 2/7411 52/232 |
| 2016/0201319 A1 * | 7/2016 | Pilz | E04B 1/944 52/232 |
| 2016/0249426 A1 | 8/2016 | Holtman et al. | |
| 2016/0314620 A1 | 10/2016 | Reilly et al. | |

OTHER PUBLICATIONS

Ribbed Foam Core by Fiber-Tech Product Literature (Year: 2012).*
NPL—Cite No. 1—Lucas Samaras Website available at least as early as Aug. 11, 2015 at: http://twistedsifter.com/2015/08/lucas-samaras-mirrored-room-installation/.
NPL—Cite No. 2—Website available at least as early as Feb. 15, 2017 at https://www.thebroad.org/art/exhibitions/yayoi-kusama-infinity-mirrored-room.

* cited by examiner

IMMERSIVE DEVICE

CROSS REFERENCE TO RELATED APPLICATIONS

This application is a continuation-in-part of U.S. Non-Provisional application Ser. No. 15/867,619, filed on Jan. 10, 2018, entitled "Immersive Device", which is a continuation-in-part of U.S. Non-Provisional application Ser. No. 15/454,121, filed on Mar. 9, 2017, entitled "Immersive Device", and which is hereby incorporated by reference in its entirety.

FIELD OF THE INVENTION

This patent specification relates to the field of reflection generating devices. More specifically, this patent specification relates to devices configured to immerse an individual in a reflection generating environment.

BACKGROUND

In both entertainment and the arts, observers are seeking more immersive and all-encompassing experiences with increasingly dramatic sensory stimulation, such as produced with virtual reality devices, experiential art rooms, immersive lighting shows at concerts, etc. However, these immersive experiences are limited to either a virtual world produced by a screen (e.g. VR headsets), require large scale environments that are generally only publically available, or fail to produce a truly immersive experience that fully encompasses the observers entire visual field with novel sensory stimuli. Therefore, there exists a need for a device that immerses the observer in a fully encompassing visual field of novel sensory stimuli.

BRIEF SUMMARY OF THE INVENTION

An immersive device is provided which creates an experientially immersive space for receiving one or more observers, whereby the observer's perceptions of what is physical/real and what are virtual replications of the real are blurred. The device creates the illusion of a vast expanse of space bounded within the confines of a small box. It also gives the observer a high level of control over their entire visual field which can be easily manipulated with the introduction of various light sources or other elements like fog/haze that interfere with the light. The device may quickly change the environment of the observer from an introspective and meditative space to an apparent large and populated club with intensely immersive sound-responsive light shows to an apparent small neon lit stage with 360 degree views of the self etc. Additionally, environments created within the device can be sequenced over a short amount of time to create a disorienting sense of one's place in space and time, having a definite psychologically novel and entertaining effect on the user.

In some embodiments, an immersive device may include a floor sidewall having a floor reflective mirrored surface. A first sidewall may be coupled perpendicularly to the floor sidewall, and the first sidewall may have a backing coupled to a mirror, the mirror having a first wall reflective mirrored surface. A second sidewall may be coupled perpendicularly to the floor sidewall and coupled perpendicularly to the first sidewall, and the second sidewall may have a backing coupled to a mirror, the mirror having a second wall reflective mirrored surface. A third sidewall may be coupled perpendicularly to the floor sidewall opposite the first sidewall and coupled perpendicularly to the second sidewall, and the third sidewall may have a backing coupled to a mirror, the mirror having a third wall reflective mirrored surface. A fourth sidewall may be coupled perpendicularly to the floor sidewall opposite the second sidewall and coupled perpendicularly to both the first sidewall and third sidewall, and the fourth sidewall may have a backing coupled to a mirror, the mirror having a fourth wall reflective mirrored surface. A ceiling sidewall may be coupled perpendicularly to the first, second, third, and fourth sidewalls and the ceiling sidewall being positioned opposite to the floor sidewall, and the ceiling sidewall may have a backing coupled to a mirror, the mirror having a ceiling reflective mirrored surface. The device may further include a reflective chamber for receiving an observer, and the floor reflective mirrored surface, the first wall reflective mirrored surface, the second wall reflective mirrored surface, the third wall reflective mirrored surface, the fourth wall reflective mirrored surface, and the ceiling reflective mirrored surface form a perimeter of and bound the reflective chamber. The device may also include a plurality of light emitting elements with one or more of light emitting elements may be configured to emit light into the reflective chamber, and a processing unit may be in electrical communication with the plurality of light emitting elements. Preferably, one or more of light emitting elements may be coupled to an external side of the first wall reflective mirrored surface while an internal side of the first wall reflective mirrored surface is facing the reflective chamber so that the at least one of the plurality of light emitting elements communicates light through the first wall reflective mirrored surface into the reflective chamber. Optionally, a door sidewall may be configured to transition between an open position allowing access to the reflective chamber and a closed position blocking access to the reflective chamber.

In further embodiments, the device may include one or more, such as a plurality of, light emitting elements which may be disposed within the reflective chamber. Preferably, light emitting elements may be configured to illuminate with various colors and intensities of light allowing a plurality of color patterns and intensity patterns to be generated within the reflective chamber.

In yet further embodiments, a mirror of one or more of the sidewalls, such as the mirror of the ceiling sidewall, may be separated from the mirror of one or more other sidewalls, such as the first sidewall, by a gap, and at least one of the plurality of light emitting elements may be positioned outside of the reflective chamber and may be configured to emit light into the reflective chamber via the gap.

In still further embodiments, the backing material of at least one of the sidewalls may comprise an expansion resistant material that is resistance to moisture induced expansion.

In further embodiments, the backing material of at least one of the sidewalls may comprise a honeycomb structure.

In still further embodiments, the backing material of at least one of the sidewalls may comprise a Fiberglass Reinforced Plastic Laminate.

In further embodiments, the device may include a door sidewall which may be configured to transition between an open position which allows access to the reflective chamber and a closed position which blocks access to the reflective chamber. The door sidewall may have a door reflective surface which may be positioned to face the reflective chamber to form a portion of the perimeter of the reflective chamber and to bound the reflective chamber when the door sidewall is in the closed position.

In still further embodiments, the device may include one or more transportation conveyances and/or a towing hitch which may facilitate or enable the coupling of the device to a vehicle that may be used to transport the device from one location to another.

In still further embodiments, a floor reflective surface, a first wall reflective surface, a second wall reflective surface, a third wall reflective surface, a fourth wall reflective surface, and/or a ceiling reflective surface may be a front surface mirror.

In yet further embodiments, a light emitting element may be a display device such as a Liquid crystal display (LCD), Light-emitting diode display (LED), Electroluminescent display (ELD), Electronic paper, E Ink, Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), and/or any other device or method which may be configured to provide or communicate illumination into the reflective chamber.

In yet further embodiments, the device may include a control input in communication with the processing unit, and the control input may include an electrode in contact with a portion of the body of the observer. The control input may be used to receive input from an observer, and the input may be used by the processing unit to control or modulate the light communicated by the light emitting elements into the reflective chamber.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
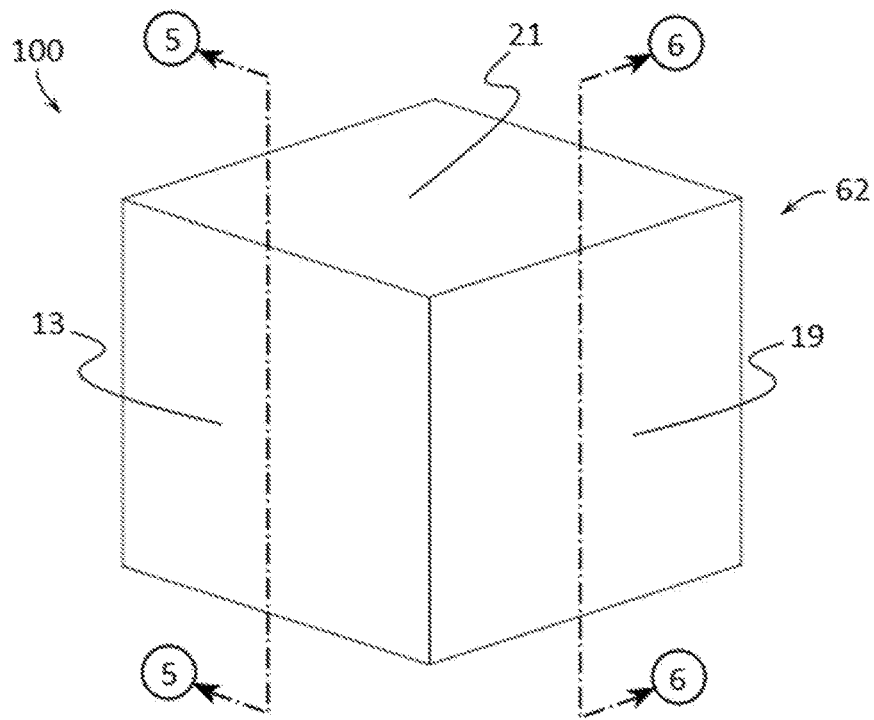
FIG. 1 depicts a perspective view of an example of an immersive device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

New devices configured to immerse an individual in a reflection generating environment are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-13 illustrate examples of an immersive device ("the device") 100 according to various embodiments. In some embodiments, the device 100 may comprise a rectangular, preferably square, floor sidewall 11 having a floor reflective surface 12. A rectangular first sidewall 13, having a first wall reflective surface 14, may be coupled to the floor sidewall 11. A rectangular second sidewall 15, having a second wall reflective surface 16, may be coupled to the floor sidewall 11 and coupled to the first sidewall 13. A rectangular third sidewall 17, having a third wall reflective surface 18, may be coupled to the floor sidewall 11 opposite the first sidewall 13 and coupled to the second sidewall 15. A rectangular fourth sidewall 19, having a fourth wall reflective surface 20, may be coupled to the floor sidewall 11 opposite the second sidewall 15 and coupled to both the first sidewall 13 and third sidewall 17. A rectangular, preferably square, ceiling sidewall 21, having a ceiling reflective surface 22, may be coupled to the first, second, third, and fourth sidewalls, and the ceiling sidewall 21 may be positioned opposite to the floor sidewall 11. The floor reflective surface 12, first wall reflective surface 14, second wall reflective surface 16, third wall reflective surface 18, fourth wall reflective surface 20, and ceiling reflective surface 22 may form the perimeter of and bound a reflective chamber 71.

In some embodiments, the sidewalls 13, 15, 17, 19, floor sidewall 11, ceiling sidewall 21, may be coupled or positioned together to form a generally parallelepiped, such as a rectangular cuboid, cube, rhombohedron, or any other polyhedron with six faces, shaped device 100. In preferred embodiments, the sidewalls 13, 15, 17, 19, may each be square shaped having approximately equal dimensions. In further embodiments, the floor sidewall 11 may be coupled or positioned approximately perpendicularly, such as between 80 to 100 degrees, and preferably between 89 to 91 degrees, to the first sidewall 13, second sidewall 15, third sidewall 17, and/or fourth sidewall 19. In even further embodiments, the ceiling sidewall 21 may be coupled or positioned approximately perpendicularly, such as between 80 to 100 degrees, and preferably between 89 to 91 degrees, to the first sidewall 13, second sidewall 15, third sidewall 17, and/or fourth sidewall 19. In still further embodiments, one sidewall 13, 15, 17, 19, may be coupled or positioned approximately perpendicularly, such as between 80 to 100 degrees, and preferably between 89 to 91 degrees, to two other sidewalls 13, 15, 17, 19.

In some embodiments, one or more sidewalls 11, 13, 15, 17, 19, 21, 23, may be formed from or comprise a substantially rigid material to which the respective reflective surface 12, 14, 16, 18, 20, 22, may be coupled to thereby allowing the reflective surface 12, 14, 16, 18, 20, 22, to be substantially rigid. Exemplary substantially rigid materials may include steel alloys, aluminum alloys, any other type of metal or metal alloy, any type of ceramic, earthenware, natural stone, synthetic stone, various types of hard plastics, such as nylon, acrylic, uPVC, HDPE, melamine, hard rubbers, fiberglass, carbon fiber, resins, such as epoxy resin, wood, other plant based materials, or any other material including combinations of materials that are substantially rigid and suitable for resisting deformation. In alternative embodiments, the floor sidewall 11, ceiling sidewall 21, and/or one or more sidewalls 13, 15, 17, 19, may be formed from or comprise a flexible material to which the respective reflective surface 12, 14, 16, 18, 20, 22, may be coupled to thereby allowing the reflective surface 12, 14, 16, 18, 20, 22, to be flexible. Exemplary flexible materials may include flexible plastics, rubber, melamine, fiberglass, carbon fiber, flexible resins, or any other material which may flex and also return to its original shape.

Figure 7:
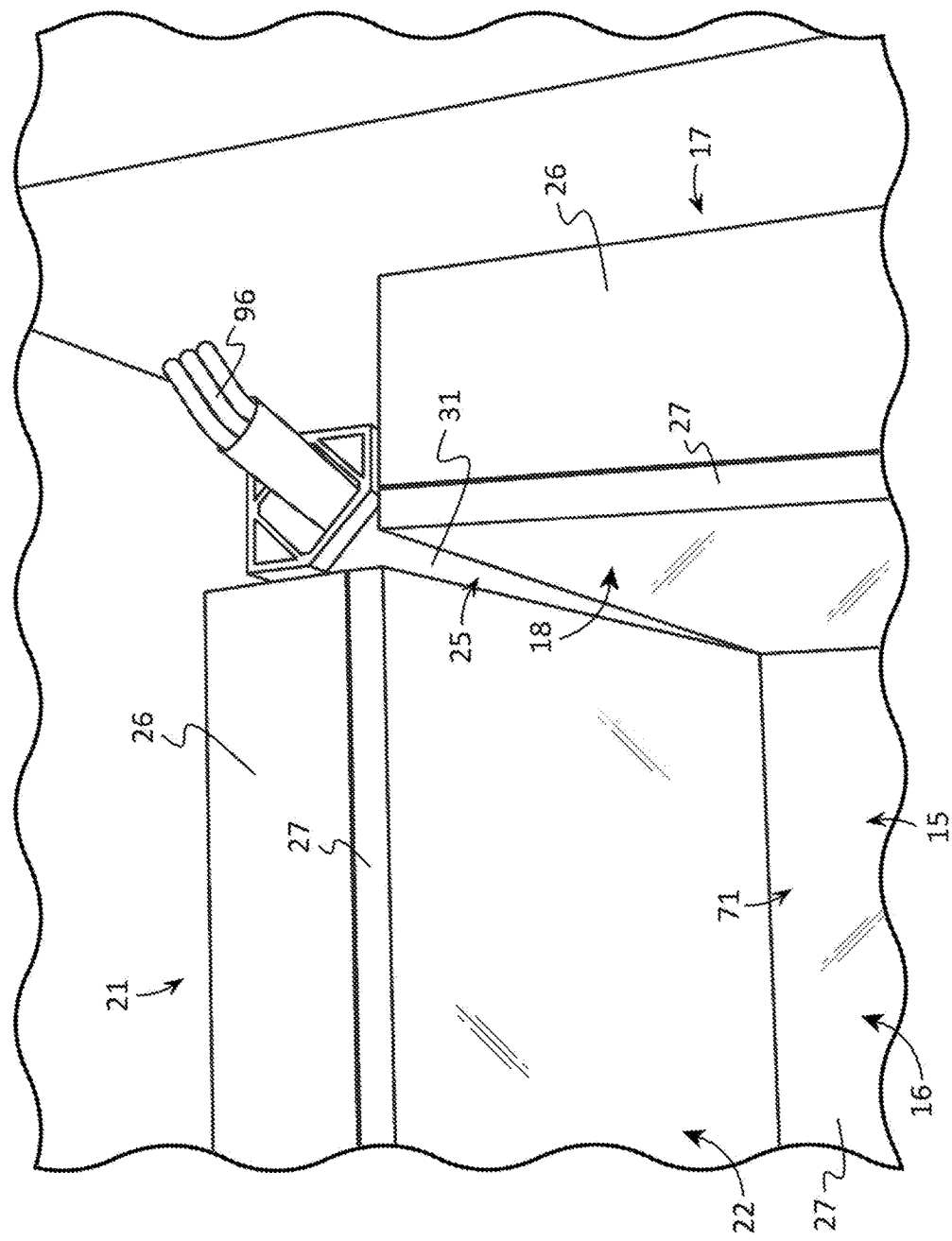
FIG. 7 depicts a partial perspective view of the intersection of sidewalls bounding the reflective chamber according to various embodiments described herein.
Figure 8:
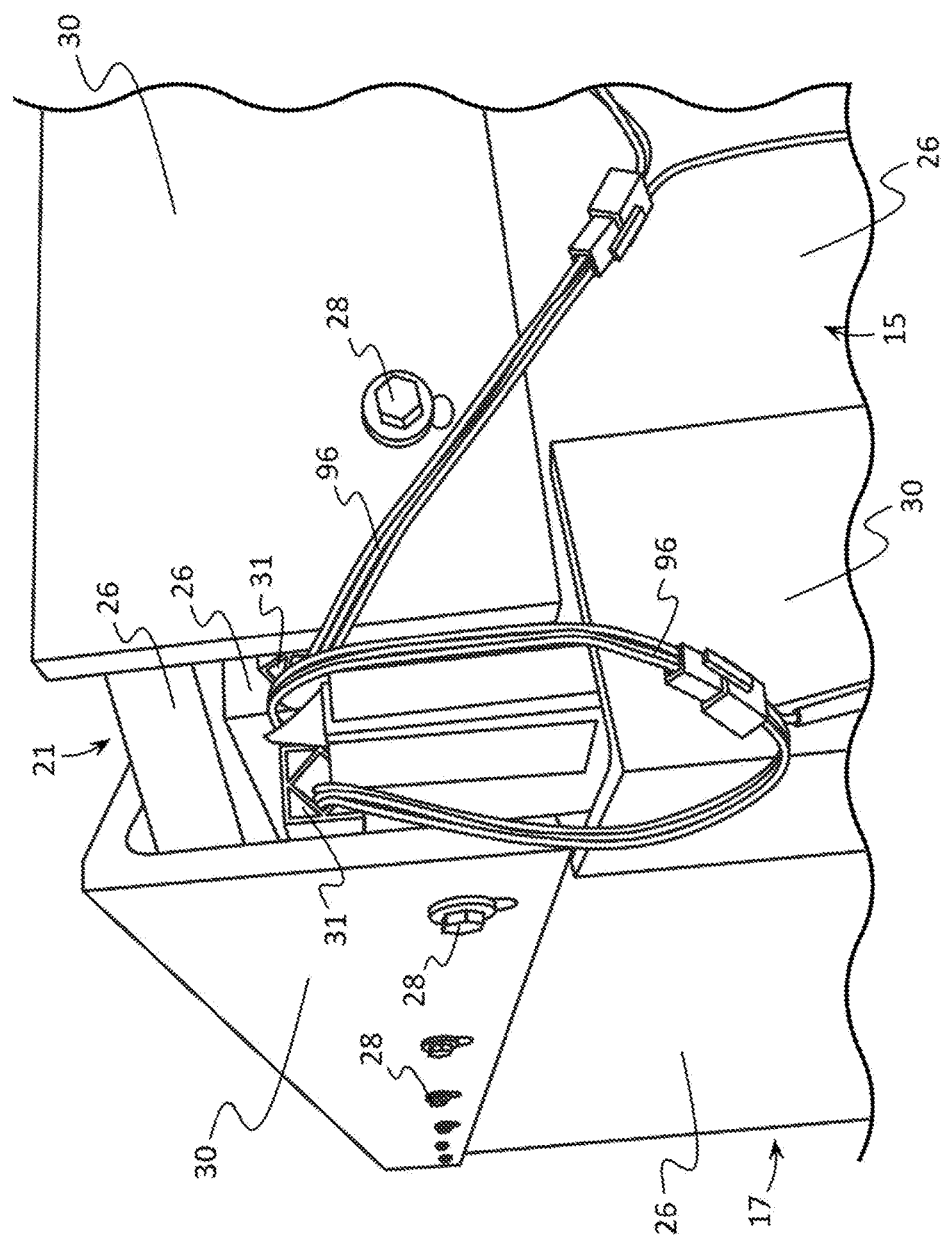
FIG. 8 illustrates a partial perspective exterior view of the intersection of sidewalls according to various embodiments described herein.
Figure 9:
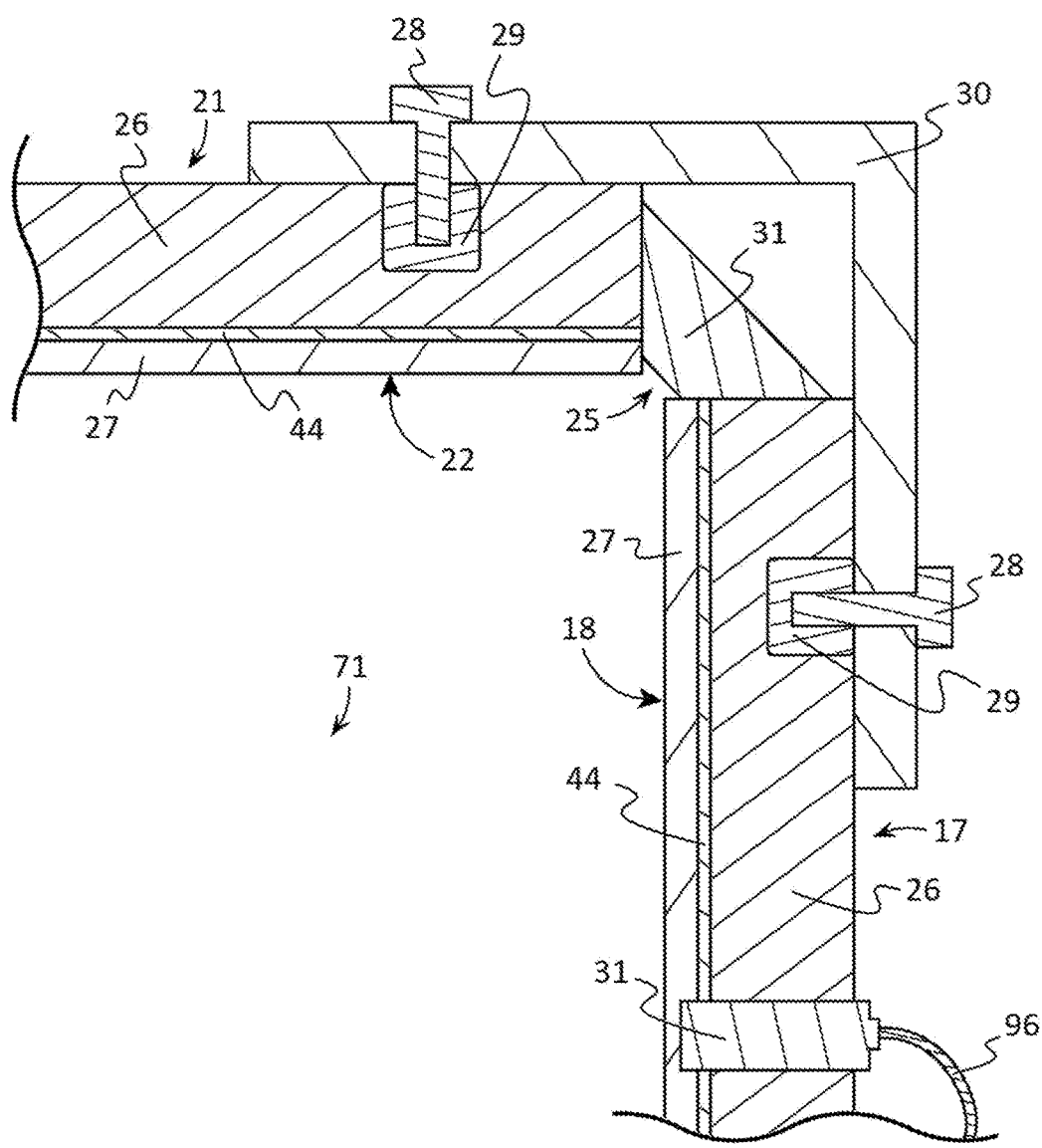
FIG. 9 shows a sectional view of an example of two sidewalls coupled together according to various embodiments described herein.

In preferred embodiments and as best shown in FIGS. 7-9, one or more sidewalls 11, 13, 15, 17, 19, 21, 23, may each comprise a backing 26 and a mirror 27 which may be coupled together to form one or more of the sidewalls 11, 13, 15, 17, 19, 21, 23, and their respective reflective surfaces 12, 14, 16, 18, 20, 22, 24. A mirror 27 may form or provide the reflective surface 12, 14, 16, 18, 20, 22, 24, of a sidewall 11, 13, 15, 17, 19, 21, 23, while the backing 26 may be formed of or comprise a substantially rigid material suitable for structurally supporting the mirror 27 and other elements of the device 100. One or more mirror fasteners 44 may be used to couple a mirror 27 and backing 26 together. In some embodiments, a mirror fastener 44 may comprise an adhesive, such as an epoxy, while in other embodiments, a mirror fastener 44 may comprise any suitable fastener or coupling method that may be used to couple a backing 26 and a mirror 27 together, such as heat bonding, threaded fasteners, etc. A mirror 27 may comprise any type of mirror and preferably a glass mirror, such as a silver glass mirror, an aluminum glass mirror, a low aluminum glass mirror, a safety glass mirror, or a silkscreen printed glass mirror.

Figure 14:
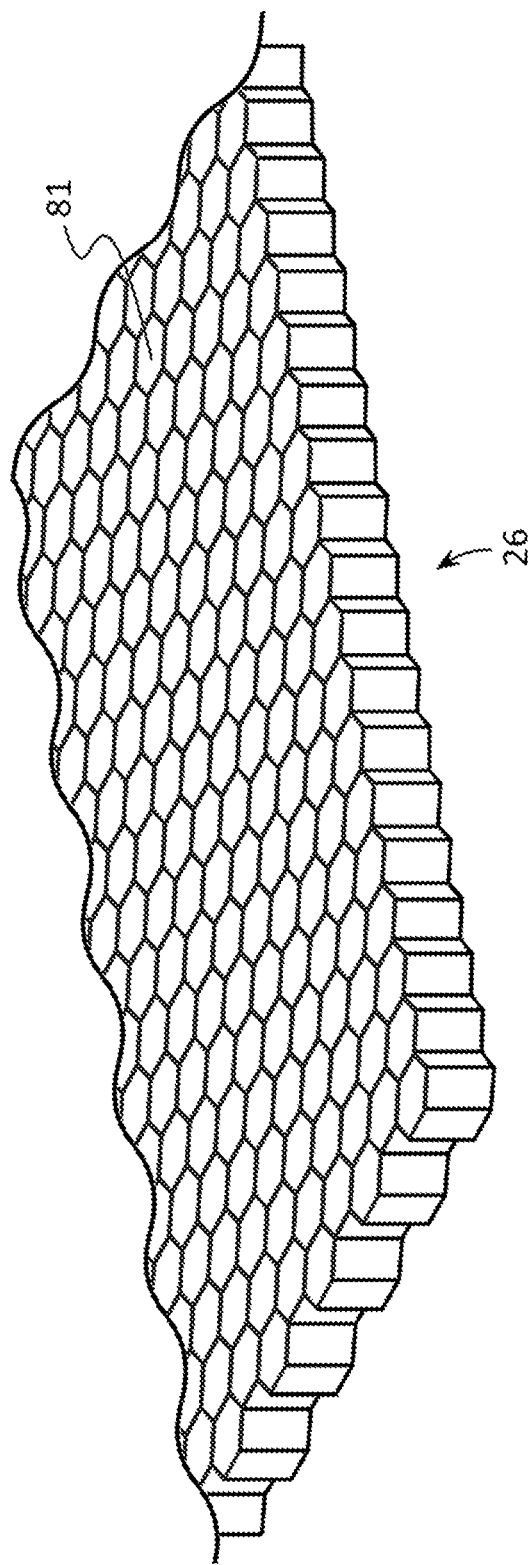
FIG. 14 illustrates a perspective view of an example of a backing having a honeycomb structure according to various embodiments described herein.

In preferred embodiments, a backing 26 may comprise a substantially rigid material that is generally expansion resistant so as to be resistant to thermal and/or moisture induced expansion, such as steel alloys, aluminum alloys, any other type of metal or metal alloy, any type of ceramic, earthenware, natural stone, synthetic stone, various types of hard plastics, such as nylon, acrylic, uPVC, HDPE, melamine, hard rubbers, fiberglass, carbon fiber, resins, such as epoxy resin. In further preferred embodiments, a backing 26 may comprise a honeycomb structure 81. In still further preferred embodiments, a backing 26 may comprise a composite laminate, such as Fiberglass Reinforced Plastic Laminate which may be generally manufactured utilizing multiple layers of woven roving fiberglass and reinforced mattes/fabrics wetted-out with polyester resins utilizing a "heat accelerated vacuum assisted infusion" process producing larges rigid seamless panels. Preferably, the backing 26 may comprise a Fiberglass Reinforced Plastic Laminate material having a honeycomb structure 81, such as Fibercore® made by Fiber-Tech Industries, Inc. or any other Fiberglass Reinforced Plastic (FRP), having a mass of hexagonal prismatic cells as shown in FIG. 14. In further preferred embodiments, the backing 26 may comprise a flat or planar shape.

In further embodiments, two or more sidewalls 11, 13, 15, 17, 19, 21, 23 (each having a mirror 27 coupled to a backing 26) may be coupled together via one or more angle joints 30. An angle joint 30 may comprise any structural device or fastener which may be suitable for joining two elements in a generally perpendicular orientation. In preferred embodiments, an angle joint 30 may comprise an angle iron commonly known to have an elongated "L" shape or approximately 90-degree angle shape. By coupling two sidewalls 11, 13, 15, 17, 19, 21, 23, together via an angle joint 30 having an approximately 90-degree angle shape, the two sidewalls 11, 13, 15, 17, 19, 21, 23, may be coupled generally perpendicular to each other. An angle joint 30 may be made from or comprise aluminum, steel alloys, or any other substantially rigid material.

In some embodiments, one or more exterior fasteners 28 and/or interior fasteners 29 may be used to couple a sidewall 11, 13, 15, 17, 19, 21, 23, to an angle joint 30. Generally, an exterior fastener 28 may comprise a fastener that may extend into or through an angle joint 30 and a backing 26 of a sidewall 11, 13, 15, 17, 19, 21, 23. In preferred embodiments, an exterior fastener 28 may comprise a threaded fastener such as a bolt, screw, etc. In other embodiments, an exterior fastener 28 may comprise a rivet, other type of blind fastener, adhesive, heat bonding, or any other type of fastener or fastening method.

Generally, an interior fastener 29 may comprise a fastener which may be positioned in a backing 26 and configured to engage with an exterior fastener 28 while preventing the exterior fastener 28 from contacting or otherwise interacting with the mirror 27 that is coupled to the backing 26. In preferred embodiments, an interior fastener 29 may comprise a fastener having threading that may engage with the threading of an exterior fastener 28, such as a potted-in fastener. A potted-in fastener or insert is one of two basic styles of inserts used in honeycomb sandwich panels. These are commonly referred to as "Wall Panel Inserts" or "Floating Inserts" because they are widely used in aircraft walls and stowage bins to fasten panels to each other and to the aircraft structure. However, potted inserts can be used anywhere a fastener is desired, particularly where blind holes that do not pass all the way through the panel are needed or where inserts must be "flush" with the panel skin. In other words, there are no flanges, like that of a press-fit/adhesive bonded insert, to be glued to the top and bottom skins of the panel. Preferably, a hole is drilled into or partially through a backing 26 and the potted-in insert is placed into the hole and secured therein via adhesive. In other embodiments, an interior fastener 29 may comprise a rivet, other type of blind fastener, adhesive, heat bonding, or any other type of fastener or fastening method.

In some embodiments, the reflective surfaces 12, 14, 16, 18, 20, 22, may be coupled or positioned together to form a generally parallelepiped, such as a rectangular cuboid, cube, rhombohedron, or any other polyhedron with six faces, shaped reflective chamber 71. In preferred embodiments, the wall reflective surfaces 14, 16, 18, 20, may each be square shaped having approximately equal dimensions. In further preferred embodiments, the floor reflective surface 12 and ceiling reflective surface 22 may each be square shaped having approximately equal dimensions. In further embodiments, the floor reflective surface 12 may be coupled or positioned approximately perpendicularly, such as between 80 to 100 degrees, and preferably between 89 to 91 degrees, to the first wall reflective surface 14, second wall reflective surface 16, third wall reflective surface 18, and/or fourth wall reflective surface 20. In even further embodiments, the ceiling wall reflective surface 22 may be coupled or positioned approximately perpendicularly, such as between 80 to 100 degrees, and preferably between 89 to 91 degrees, to the first wall reflective surface 14, second wall reflective surface 16, third wall reflective surface 18, and/or fourth wall reflective surface 20. In still further embodiments, one wall reflective surface 14, 16, 18, 20, may be coupled or positioned approximately perpendicularly, such as between 80 to 100 degrees, and preferably between 89 to 91 degrees, to two other reflective surface 14, 16, 18, 20.

Figure 2:
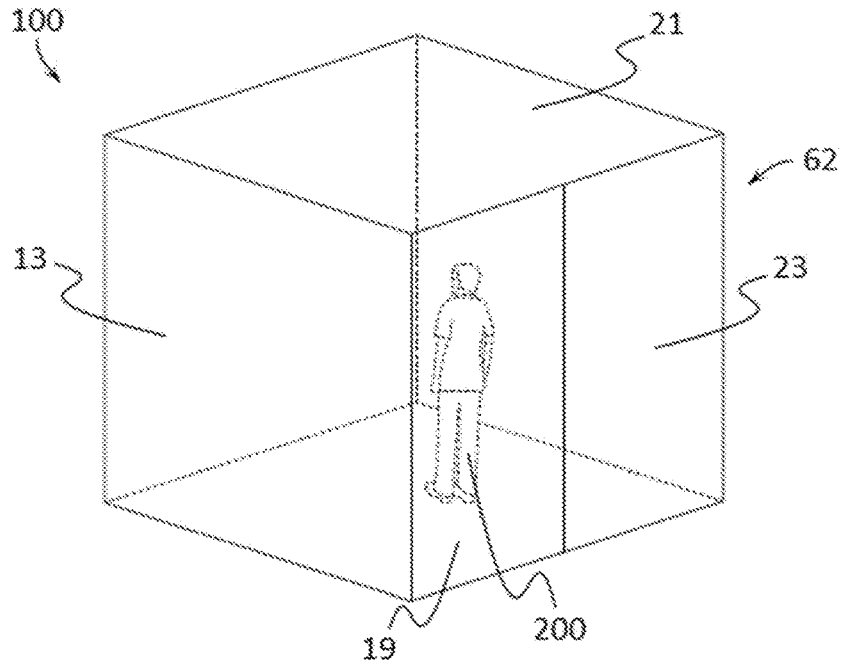
FIG. 2 illustrates a perspective view of another example of an immersive device according to various embodiments described herein.
Figure 3:
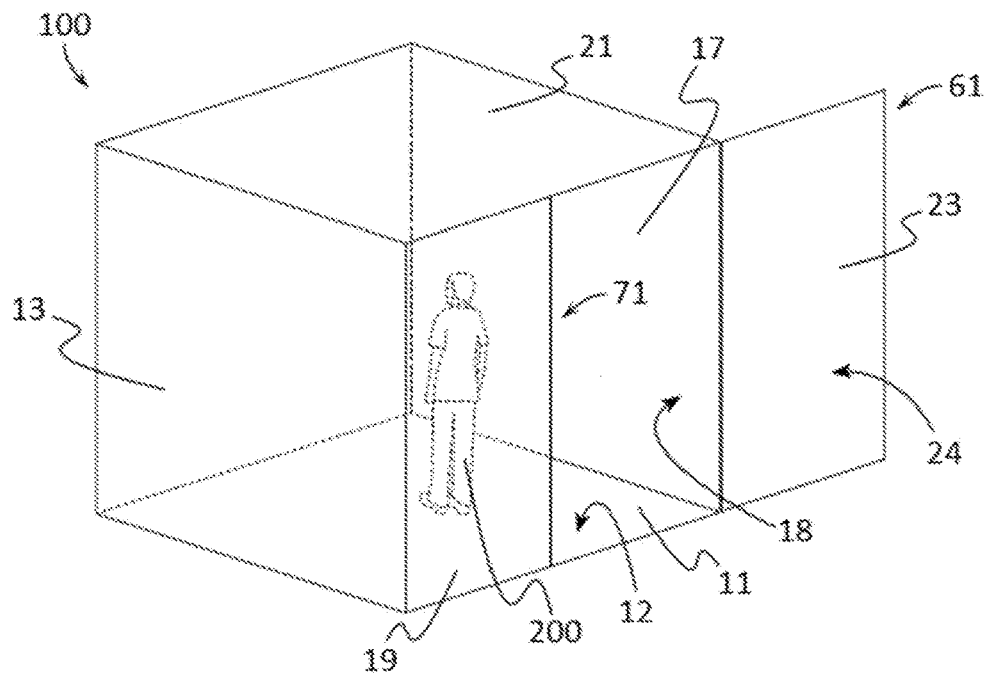
FIG. 3 shows a perspective view of a further example of an immersive device according to various embodiments described herein.
Figure 4:
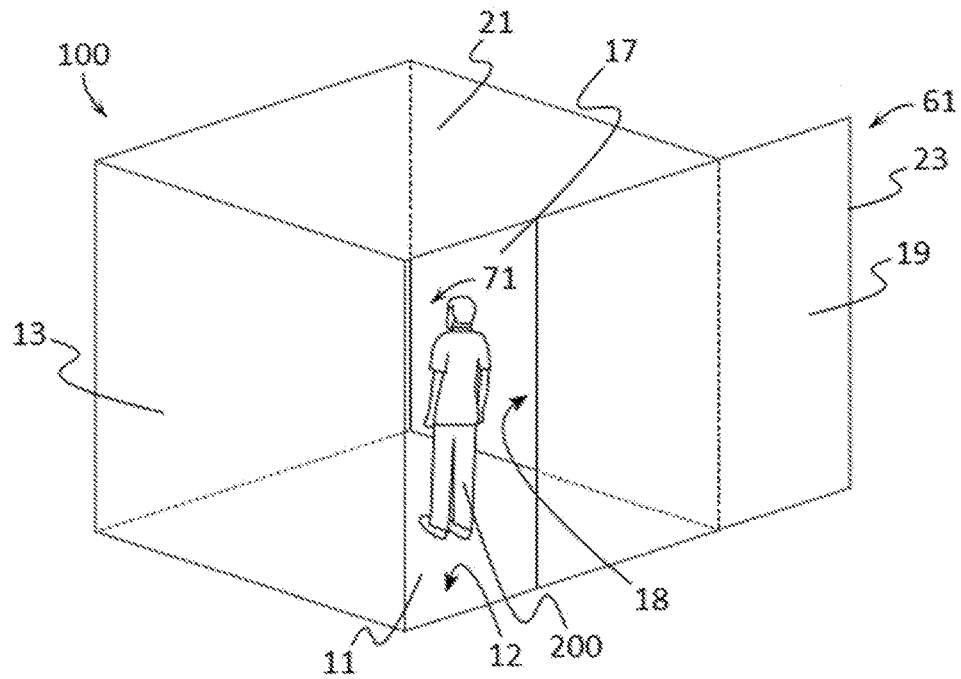
FIG. 4 depicts a perspective view of still another example of an immersive device according to various embodiments described herein.
Figure 5:
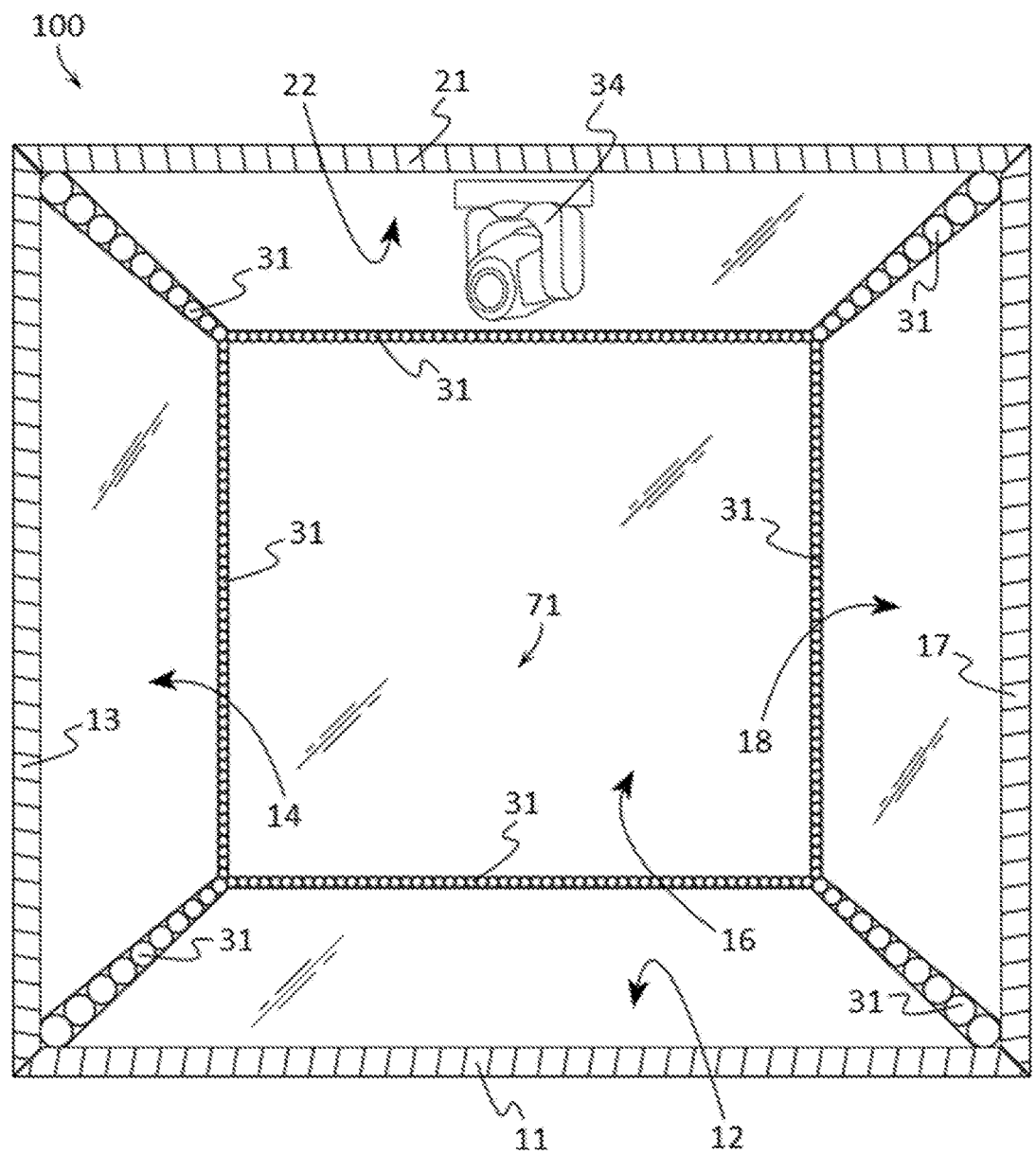
FIG. 5 illustrates a sectional, through line 5-5 shown in FIG. 1, elevation view of an example of an immersive device according to various embodiments described herein.
Figure 6:
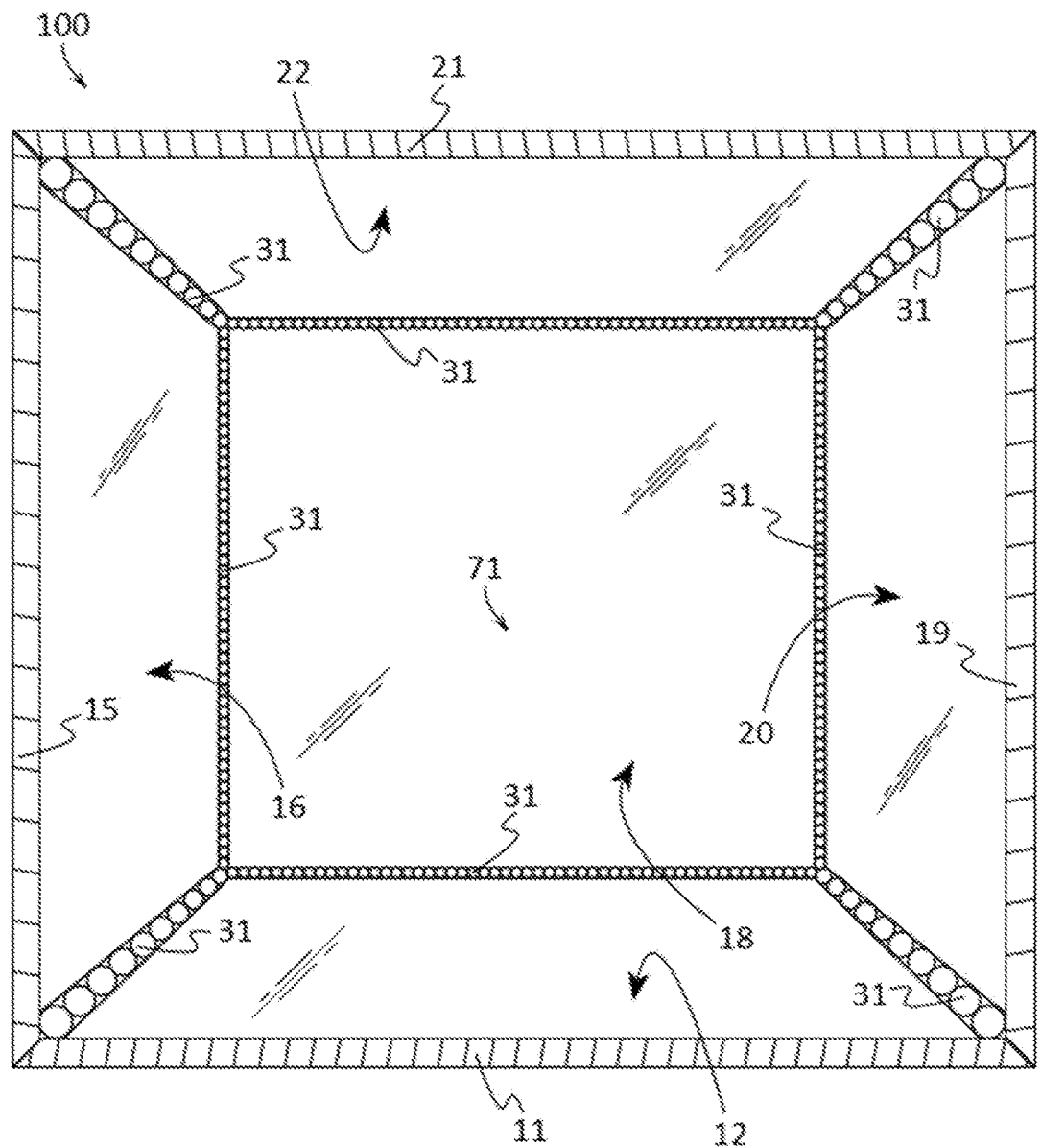
FIG. 6 shows a sectional, through line 6-6 shown in FIG. 1, elevation view of an example of an immersive device according to various embodiments described herein.

In some embodiments and as shown in FIGS. 2-4, the device 100 may comprise a door sidewall 23 which may be configured to transition between an open position 61 which allows access to the reflective chamber 71 and a closed position 62 which blocks access to the reflective chamber 71. The door sidewall 23 may have a door reflective surface 24 which may be positioned to face the reflective chamber 71 to form a portion of the perimeter of the reflective chamber 71 and to bound the reflective chamber 71 when the door sidewall 23 is in the closed position 62. A door sidewall 23 may be movably coupled to a floor sidewall 11, sidewall 13, 15, 17, 19, ceiling sidewall 21, or any other element of the device 100. In some embodiments, a door sidewall 23 may be movably coupled with any suitable type of hinged coupling, such as a butt hinge, butterfly hinge, flush hinge, barrel hinge, concealed hinge, continuous hinge, T-hinge, strap hinge, double-acting hinge, Soss hinge, or the like, which may enable the door sidewall 23 to pivot between the open position 61 and the closed position 62. In other embodiments, a door sidewall 23 may be movably coupled with any suitable type of sliding door coupling, such as a sliding door track coupling, a barn door coupling, or the like, which may enable the door sidewall 23 to slide between the open position 61 and the closed position 62. In still other embodiments, a door sidewall 23 may be movably coupled with any suitable type of movable coupling which may enable the door sidewall 23 to transition between the open position 61 and the closed position 62.

In further embodiments and as best shown in FIG. 4, the door sidewall 23 may be formed by a sidewall 13, 15, 17, 19, such as the fourth sidewall 19. The fourth sidewall 24 may function as the door sidewall 23 and the fourth sidewall 19 may be configured to transition between an open position 61 which allows access to the reflective chamber 71 and a closed position 62 which blocks access to the reflective chamber 71. In this manner, the fourth wall reflective surface 20 may comprise a door reflective surface 24, and the door reflective surface 24, and therefore all or portions of the fourth wall reflective surface 20 may be configured to transition between the open position 61 and the closed position 62. A fourth sidewall 19 may be movably coupled to a floor sidewall 11, other sidewall 13, 15, 17, ceiling sidewall 21, or any other element of the device 100 with any suitable type of movable coupling which may enable the fourth sidewall 19 to transition between the open position 61 and the closed position 62.

In still further embodiments, a door sidewall 23 may be formed by one or more elements, such as a floor sidewall 11, sidewall 13, 15, 17, 19, and/or ceiling sidewall 21 which may be moved around an observer 200 to enable an observer to enter and exit the reflective chamber 71. For example, the observer 200 may step between a floor sidewall 11 and a ceiling sidewall 21 and one or more sidewalls 13, 15, 17, 19, may be moved from below the floor sidewall 11 or moved from above the ceiling sidewall 21 to position the observer in the reflective chamber 71.

In alternative embodiments, the device 100 may not comprise a door sidewall 23 and one or more elements, such as a floor sidewall 11, sidewall 13, 15, 17, 19, and/or ceiling sidewall 21 may be assembled around or otherwise moved and positioned to enable an observer to enter and exit the reflective chamber 71.

Each reflective surface 12, 14, 16, 18, 20, 22, 24, may be configured to reflect visible light and may be formed from or comprise a light reflecting material. Preferably, one or more reflective surfaces 12, 14, 16, 18, 20, 22, 24, may comprise a mirrored surface formed of a light reflecting material. Exemplary light reflecting materials may include: reflective or polished steel, aluminum, or other metal materials, mirrors, plastic mirrors, glass mirrors, mirror coatings, chrome coatings, reflective paints, or any other suitable light reflecting method. In some embodiments, a reflective surface 12, 14, 16, 18, 20, 22, 24, may be or may comprise a first surface mirror or front surface mirror (also commonly abbreviated FS mirror or FSM) with the reflective surface being above a backing. In other embodiments, a reflective surface 12, 14, 16, 18, 20, 22, 24, may be or may comprise a second surface mirror with the reflective surface behind a transparent substrate such as glass or acrylic.

Turning now to FIGS. 5-11 and 13, in some embodiments, the device 100 may comprise one or more, such as a plurality of, light emitting elements 31 which may be disposed within the reflective chamber 71 or otherwise configured to emit light into the reflective chamber 71. Preferably, each of the light emitting elements 31 may be in communication with the processing unit 90, so that the processing unit 90 may control each light emitting element 31 to illuminate with various colors and intensities of light thereby allowing a plurality of color patterns and intensity patterns to be generated within the reflective chamber 71.

In some embodiments, a light emitting element 31 may comprise a light emitting diode (LED) which may be configured to provide light of various wavelengths and intensities. In further embodiments, a light emitting element 31 may comprise a laser light emitter which may be optionally motorized for directing the laser light in various directions and motion patterns. In still further embodiments, a light emitting element 31 may comprise an organic light-emitting diode (OLED), incandescent light bulb, fluorescent light, bulb halogen light bulb, high-intensity discharge light bulb, electroluminescent light source, neon light source, light strips, chemical light generating devices, such as glow sticks, or any other type of suitable light source. In still further embodiments, a light emitting element 31 may comprise a display device 31A (FIG. 13) such as a Liquid crystal display (LCD), Light-emitting diode display (LED), Electroluminescent display (ELD), Electronic paper, E Ink, Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), and/or any other device or method which may be configured to provide or communicate illumination into the reflective chamber 71.

In some embodiments, one or more, such as a plurality of, light emitting elements 31 may be disposed anywhere within the reflective chamber 71 or otherwise configured to emit light anywhere within the reflective chamber 71. In some embodiments, one or more, such as a plurality of, light emitting elements 31 may be disposed within the reflective chamber 71 at an intersection of a sidewall reflective surface 14, 16, 18, 20, and/or a door reflective surface 24 with another sidewall reflective surface 14, 16, 18, 20. In further embodiments, one or more, such as a plurality of, light emitting elements 31 may be disposed within the reflective chamber 71 at an intersection of a sidewall reflective surface 14, 16, 18, 20, and/or a door reflective surface 24 with the ceiling reflective surface 22. In still further embodiments, one or more, such as a plurality of, light emitting elements 31 may be disposed within the reflective chamber 71 at an intersection of a sidewall reflective surface 14, 16, 18, 20, and/or a door reflective surface 24 with the floor reflective surface 12. In preferred embodiments, one or more, such as a plurality of, light emitting elements 31 may be disposed within the reflective chamber 71 at each intersection of a sidewall reflective surface 14, 16, 18, 20, with another sidewall reflective surface 14, 16, 18, 20, with the ceiling reflective surface 22, and with the floor reflective surface 12.

In some embodiments and as shown in FIGS. 7-9 and 13, the device 100 may comprise one or more light emitting elements 31 which may be disposed or positioned outside the reflective chamber 71 but which may be in communication with the reflective chamber 71 so that the light emitting elements 31 may provide illumination into the reflective chamber 71. In preferred embodiments, one, two, three, four, five, six, seven, eight, nine, ten, or more, such as a plurality of light emitting elements 31 may be disposed or positioned outside the reflective chamber 71 at a junction of two or more sidewalls 11, 13, 15, 17, 19, 21, 23. The device 100 may comprise a gap 25 at each intersection of two sidewalls 11, 13, 15, 17, 19, 21, 23, and their reflective surfaces 12, 14, 16, 18, 20, 22, 24, so that the light from the light emitting elements 31 may enter the reflective chamber 71 through the gaps 25. A gap 25 may comprise an opening or space of any size and shape at the intersection of two sidewalls 11, 13, 15, 17, 19, 21, 23. For example, the sidewalls 11, 13, 15, 17, 19, 21, 23, may be coupled together so that each sidewall 11, 13, 15, 17, 19, 21, 23, is separated from each other sidewall 11, 13, 15, 17, 19, 21, 23, by approximately 0.1 to 5.0 inches and preferably approximately 0.5 inches. For example, the device 100 may comprise twelve substantially linear gaps 25 having a width of approximately 0.5 inches and a length approximately equal to the length of each sidewall 11, 13, 15, 17, 19, 21, 23. Light emitting elements 31 may be positioned proximate to or in contact with the gaps 25 so that light from the light emitting elements 31 may be emitted substantially along the entire length and width of the twelve gaps 25. As another example, the device 100 may comprise a plurality of round or oval shaped gaps 25 that are positioned at each intersection or junction of the sidewalls 11, 13, 15, 17, 19, 21, 23. Light emitting elements 31 may be positioned proximate to or in contact with the gaps 25 so that light from the light emitting elements 31 may be emitted from each other the gaps 25.

In further embodiments, a light emitting element 31 disposed or positioned outside the reflective chamber 71 may be in communication with the reflective chamber 71 by having the light emitting element 31 direct light into the reflective chamber 71 via an aperture or opening in a sidewall 11, 13, 15, 17, 19, 21, 23, to which the light emitting element 31 is coupled. In still further embodiments, a light emitting element 31 may be embedded within a sidewall 11, 13, 15, 17, 19, 21, 23, and disposed or positioned outside the reflective chamber 71, and the light emitting element 31 may be in communication with the reflective chamber 71 by having the light emitting element 31 direct light into the reflective chamber 71 via an aperture or opening in the respective reflective surface 12, 14, 16, 18, 20, 22, 24, of the sidewall 11, 13, 15, 17, 19, 21, 23, to which the light emitting element 31 is embedded. In yet further embodiments, a light emitting element 31 may be coupled outside the chamber 71 to a sidewall 11, 13, 15, 17, 19, 21, 23, having a reflective surface 12, 14, 16, 18, 20, 22, 24, formed or comprising a one-way mirrored surface so that the light emitting element 31 may communicate light through the one-way mirrored surface into the reflective chamber 71. In still further embodiments, a light emitting element 31 may be coupled outside the reflective chamber 71 to a sidewall 11, 13, 15, 17, 19, 21, 23, having a reflective surface 12, 14, 16, 18, 20, 22, 24, and the reflective material of the reflective surface 12, 14, 16, 18, 20, 22, 24, may be removed, such as by scratching, buffing, abrading, or any other suitable method so that the light emitting element 31 may communicate light through the portion of the reflective surface 12, 14, 16, 18, 20, 22, 24, having the reflective material removed and into the reflective chamber 71.

Figure 10:
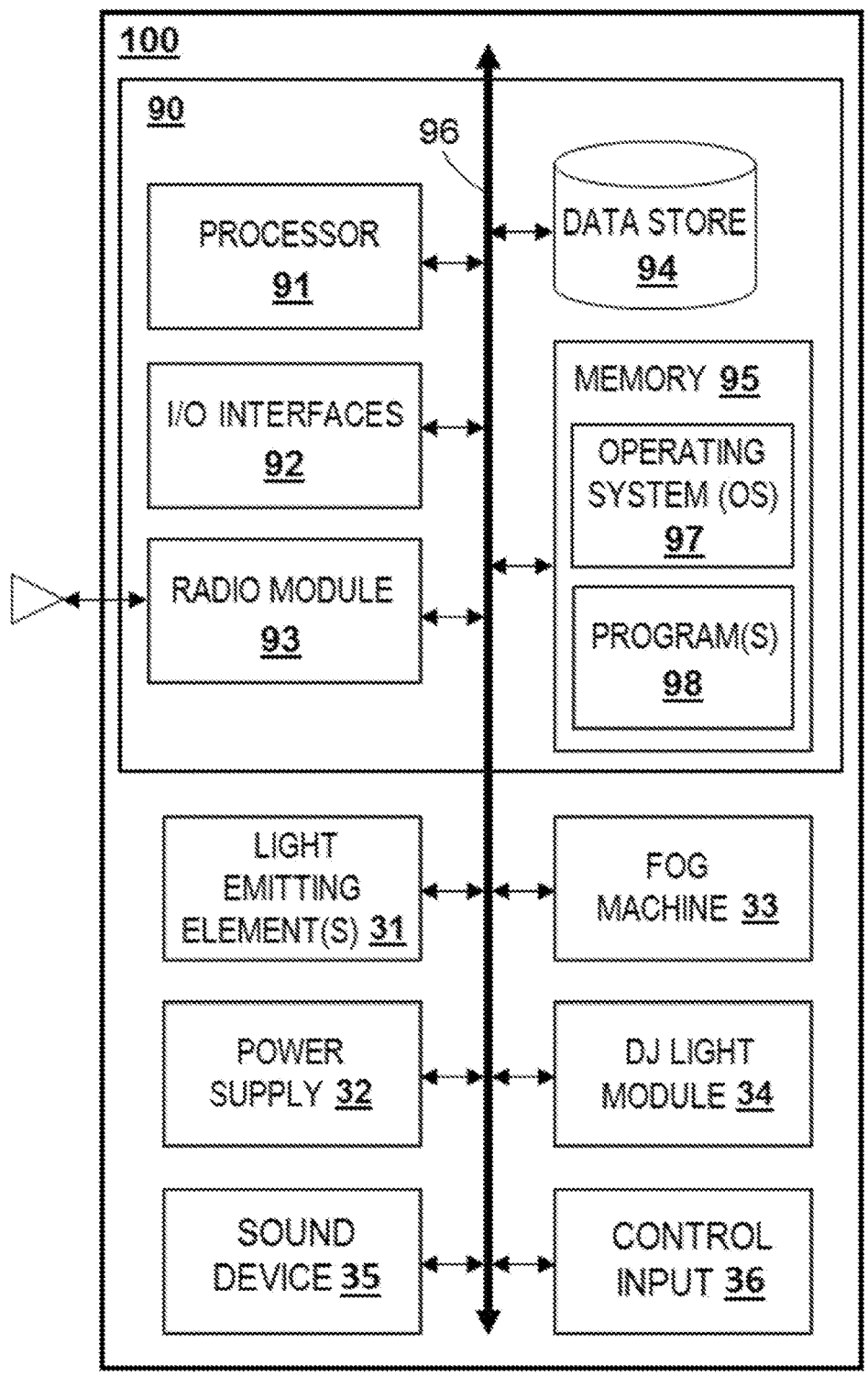
FIG. 10 depicts a block diagram of an example of an immersive device according to various embodiments described herein.

FIG. 10 depicts a block diagram of an example of an immersive device 100 according to various embodiments described herein. In some embodiments and in the present example, the device 100 can be a digital device that, in terms of hardware architecture, may optionally comprise one or more processing units 90, light emitting elements 31, power supplies 32, fog machines 33, and/or DJ light modules 34. It should be appreciated by those of ordinary skill in the art that FIG. 10 depicts an example of the device 100 in an oversimplified manner, and a practical embodiment may include additional components or elements, such as heating, ventilation, and air conditioning (HVAC) equipment, and suitably configured processing logic to support known or conventional operating features that are not described in detail herein.

The components and elements (90, 31, 32, 33, and 34) may be communicatively coupled via a local interface 96. The local interface 96 can be, for example but not limited to, one or more buses or other wired or wireless connections, as is known in the art. The local interface 96 can have additional elements, which are omitted for simplicity, such as controllers, buffers (caches), drivers, repeaters, and receivers, among many others, to enable communications. Further, the local interface 96 may include address, control, and/or data connections to enable appropriate communications among the aforementioned components.

In some embodiments, a processing unit 90 may comprise one or more processors 91, I/O interfaces 92, radio modules 93, data stores 94, and/or memory 95. The processor 91 is a hardware device for executing software instructions. The processor 91 can be any custom made or commercially available processor, a central processing unit (CPU), an auxiliary processor among several processors, a semiconductor-based microprocessor (in the form of a microchip or chip set), or generally any device for executing software instructions. When in operation, the processor 91 is configured to execute software stored within the memory 95, to communicate data to and from the memory 95, and to generally control operations of the device 100 pursuant to the software instructions. In an exemplary embodiment, the processor 91 may include a mobile optimized processor such as optimized for power consumption and mobile applications.

The I/O interfaces 92 can be used to input and/or output information and power. In some embodiments, I/O interfaces 92 may include one or more turnable control knobs, depressible button type switches, a key pad, slide type switches, dip switches, rocker type switches, rotary dial switches, numeric input switches or any other suitable input which a user may interact with to provide input. In further embodiments, I/O interfaces 92 may include one or more light emitting elements or other display device, e.g., a LED (light emitting diodes), a speaker, a video projector or digital projector, or any other suitable device for outputting or displaying information. The I/O interfaces 92 can also include, for example, a serial port, a parallel port, a small computer system interface (SCSI), an infrared (IR) interface, a radio frequency (RF) interface, a universal serial bus (USB) interface, and the like. In further embodiments, an I/O interface 92 may include a subwoofer speaker, as may be found in a sub pack (backpack with a subwoofer speaker) or as a standalone sound device 35. In still further embodiments, an I/O interface 92 may include wired and/or wireless headphones, while in even further embodiments; an I/O interface 92 may include a wired and/or wireless headphone connector. In even further embodiments, an I/O interface 92 may include a MIDI keyboard or other keyboard input.

An optional radio module 93 may enable wireless communication to an external access device or network through an antenna. A radio module 93 may comprise a wireless communication receiver and optionally a wireless communication transmitter. In some embodiments, a radio module 93 may operate on a cellular band and may communicate with or receive a Subscriber Identity Module (SIM) card or other wireless network identifier. Any number of suitable wireless data communication protocols, techniques, or methodologies can be supported by the radio module 93, including, without limitation: RF; IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 94 may be used to store data. The data store 94 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 94 may incorporate electronic, magnetic, optical, and/or other types of storage media.

The memory 95 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 95 may incorporate electronic, magnetic, optical, and/or other types of storage media. Note that the memory 95 may have a distributed architecture, where various components are situated remotely from one another, but can be accessed by the processor 92. The software in memory 95 can include one or more software programs, each of which includes an ordered listing of executable instructions for implementing logical functions. In the example of FIG. 10, the software in the memory system 95 may include a suitable operating system (O/S) 97 and programs 98. An operating system 97 essentially controls the execution of input/output interface 90 functions, and provides scheduling, input-output control, file and data management, memory management, and communication control and related services. The operating system 97 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 98 may include various applications, add-ons, etc. configured to provide end user functionality such as to control the operation of functions of one or more door sidewalls 23, light emitting elements 31, power supplies 32, fog machines 33, and/or DJ light modules 34.

In some embodiments, the device 100 may comprise a power supply 32 or power source which may provide electrical power to any component of the device 100 that may require electrical power. A power supply 32 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power supply 32 may comprise a power cord, kinetic or piezo electric battery charging device, a solar cell or photovoltaic cell, and/or inductive charging or wireless power receiver.

In some embodiments, the device 100 may comprise a fog machine 33 (fog generator or smoke machine) which may emit a dense vapor that appears similar to fog or smoke such as which is commonly used in professional entertainment applications and for personal use. Typically, fog is created by vaporizing proprietary water and glycol-based or glycerin-based fluids or through the atomization of mineral oil. This fluid (often referred to colloquially as fog juice) vaporizes or atomizes inside the fog machine. Upon exiting the fog machine and mixing with cooler outside air the vapor condenses, resulting in a thick visible fog. Preferably, a fog machine 33 may be coupled or positioned to enable the fog to be directed into the reflective chamber 71.

In some embodiments, the device 100 may comprise a DJ light module 34, such as party lights, retro lights or colorful rotating balls with multi-colored lamps in them, video and light projectors typically using a halogen or led lamp and a mirror to reflect the light. A halogen lamp shines onto a mirror via a filter gel sheet to create the color and sometimes via a gobo wheel to create shapes, and lasers having a laser diode and an array of mirrors to project multiple colors and beams of light. Preferably, a DJ light module 34 may be motorized and configured to project beams of light in moving patterns, colors, and intensities so that an observer 200 in the reflective chamber 71 may experience beams of light flashing over them, and see myriad spots of light spinning around the walls of the reflective chamber 71. In further embodiments, a DJ light module 34 may comprise a video projector or digital projector which may be an image projector that receives a video signal and projects the corresponding image on a surface of the reflective chamber 71 and/or user 200 using a lens system. A DJ light module 34 may be positioned anywhere in the reflective chamber 71 and preferably proximate to and centered with the ceiling reflective surface 22. In some embodiments, a DJ light module 34 may be retractable and extendable from the ceiling sidewall 21, floor sidewall 11, and/or a sidewall 13, 15, 17, 19. In further embodiments, a DJ light module 34 may be suspended or otherwise coupled in one or more corners of the reflective chamber 71, such as the corners formed at the junction of the floor reflective surface 12 and one or more sidewall reflective surfaces 14, 16, 18, 20, and/or the corners formed at the junction of the ceiling reflective surface 22 and one or more sidewall reflective surfaces 14, 16, 18, 20.

in some embodiments, the device 100 may comprise a sound device 35, such as a speaker, which may be used to produce a plurality of sounds and music at a plurality of volume levels. In other embodiments, a sound device 35 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds.

In some embodiments, the device 100 may comprise a control input 36 which may be used to receive input from an observer 200, and the input may be used by the processing unit 90 to control or modulate the light communicated by the light emitting elements 31 into the reflective chamber 71. In preferred embodiments, a control input 36 may comprise a neural-control interface (NCI), an electroencephalography (EEG) lead cap with the electrodes placed along the scalp, electrodes placed in contact with a portion of the body of an observer 200, or any other electrophysiological monitoring method to record electrical activity of the brain and/or body of an observer 200. A control input 36 having electrodes placed in contact with a portion of the body of an observer 200 may record the electrical activity or those portions of the body of an observer 200, and the recorded electrical activity used by the processing unit 90 to control or modulate the light communicated by the light emitting elements 31 into the reflective chamber 71. In alternative embodiments, a control input 36 may comprise turnable control knobs, depressible button type switches, a key pad, slide type switches, rocker type switches, touch screen graphical user interfaces (GUI), or any other suitable input that may be used to modulate electricity between components or to otherwise control functions of the device 100.

Figure 11:
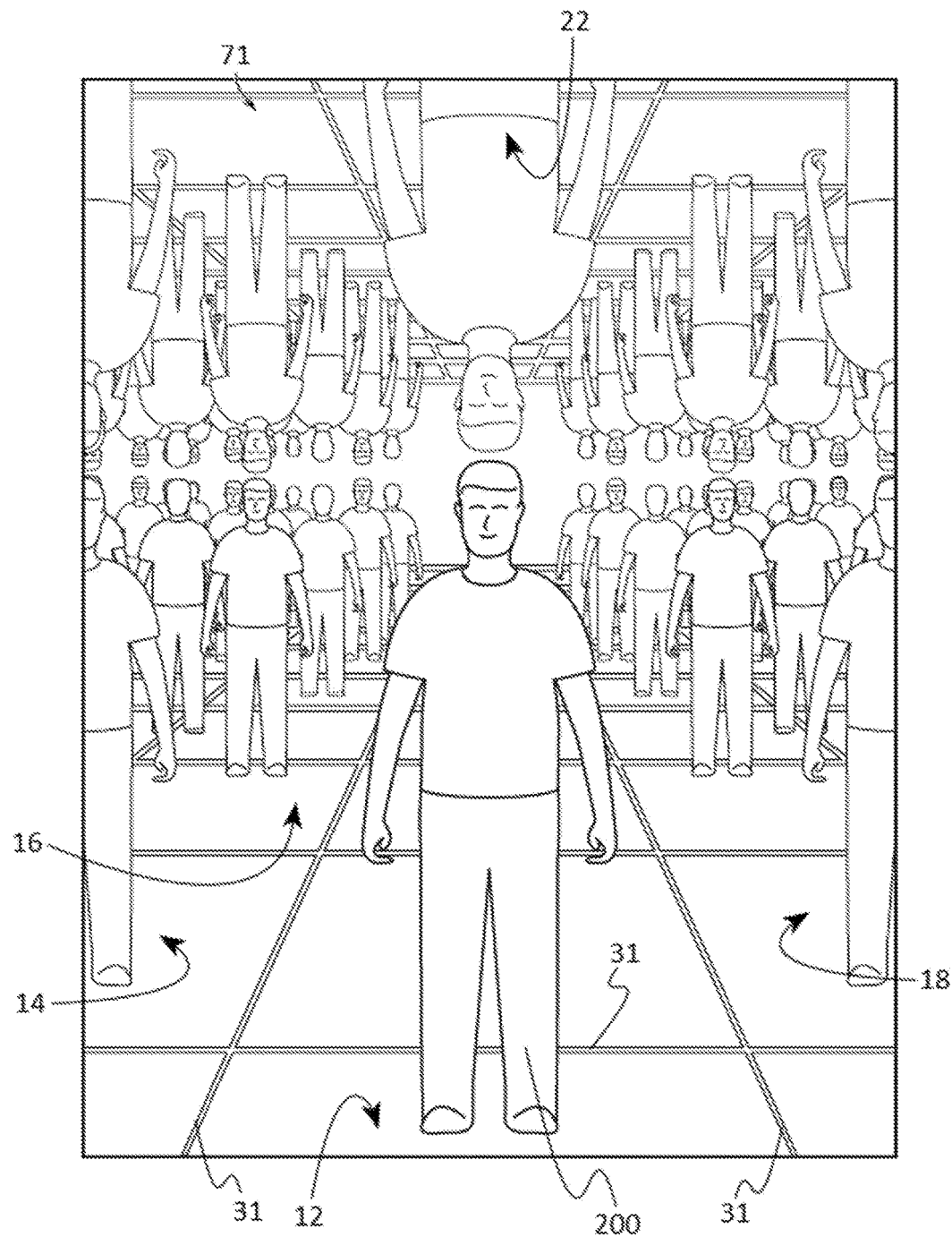
FIG. 11 illustrates a partial perspective view of an example of an immersive environment produced by an immersive device as viewed by an observer that is positioned within the device according to various embodiments described herein.

FIG. 11 illustrates a partial perspective view of an example of an immersive environment produced by an immersive device 100 as viewed by an observer 200 that is positioned within the reflective chamber 71 of the device 100 according to various embodiments described herein. The reflective surfaces 12, 14, 16, 18, 20, 22, and optionally 24, which form the perimeter of and bound the reflective chamber 71 creates an experientially immersive space whereby the observer's 200 perceptions of what is physical/real and what are virtual replications of the real are blurred. The reflective chamber 71 creates the illusion of a vast expanse of space bounded within the confines of a small box. It also gives the observer 200 a high level of control over their entire visual field which can be easily manipulated via one or more light emitting elements 31, fog machine 33, and/or DJ light module 34.

In preferred embodiments, the processing unit 90 may control one or more light emitting elements 31, fog machine 33, and/or DJ light module 34 to quickly change the environment within the reflective chamber 71 from an introspective and meditative space to a large-populated club with intensely immersive sound-responsive light shows to a small neon lit stage with 360 degree views of the self. Additionally, the processing unit 90 may control one or more light emitting elements 31, fog machine 33, and/or DJ light module 34 to provide two or more environments within the reflective chamber 71 that can be sequenced over a short amount of time to create a disorienting sense of one's place in space and time, having a definite psychologically novel and entertaining effect on the observer 200.

Figure 12:
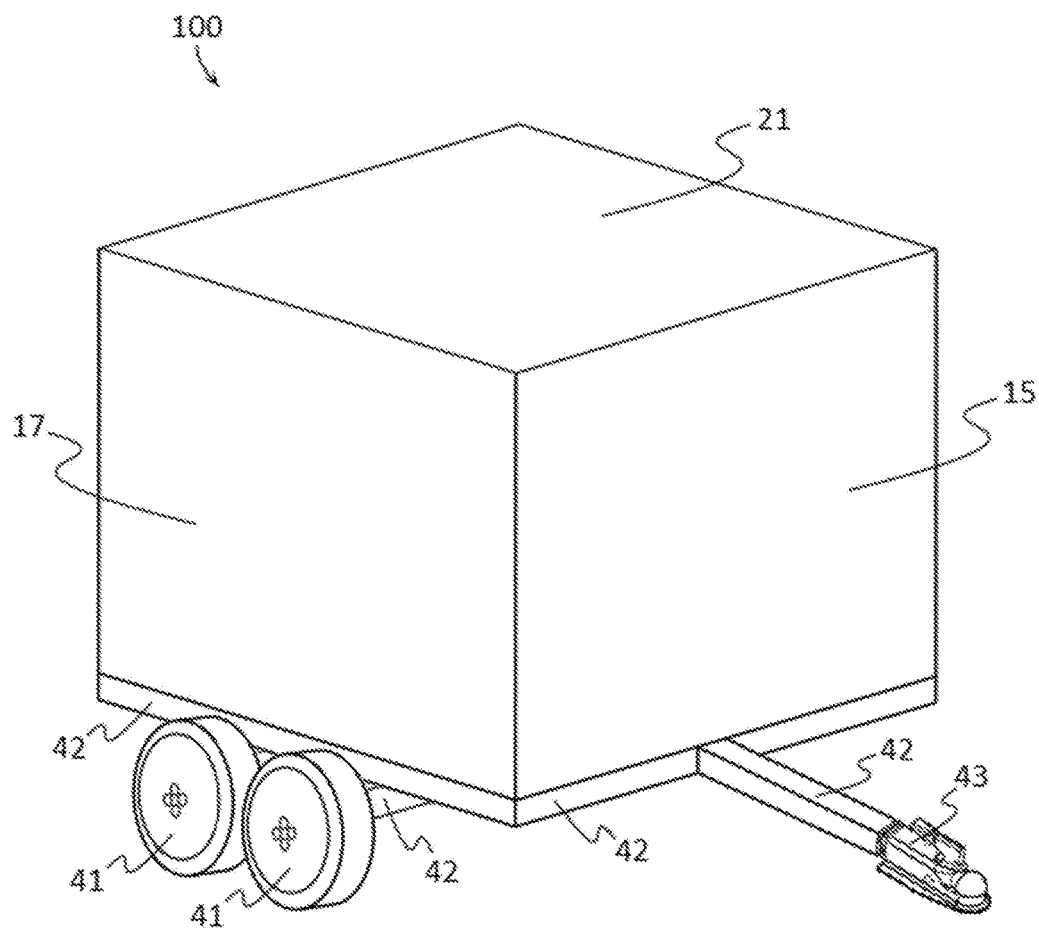
FIG. 12 shows a perspective view of still a further example of an immersive device according to various embodiments described herein.
Figure 13:
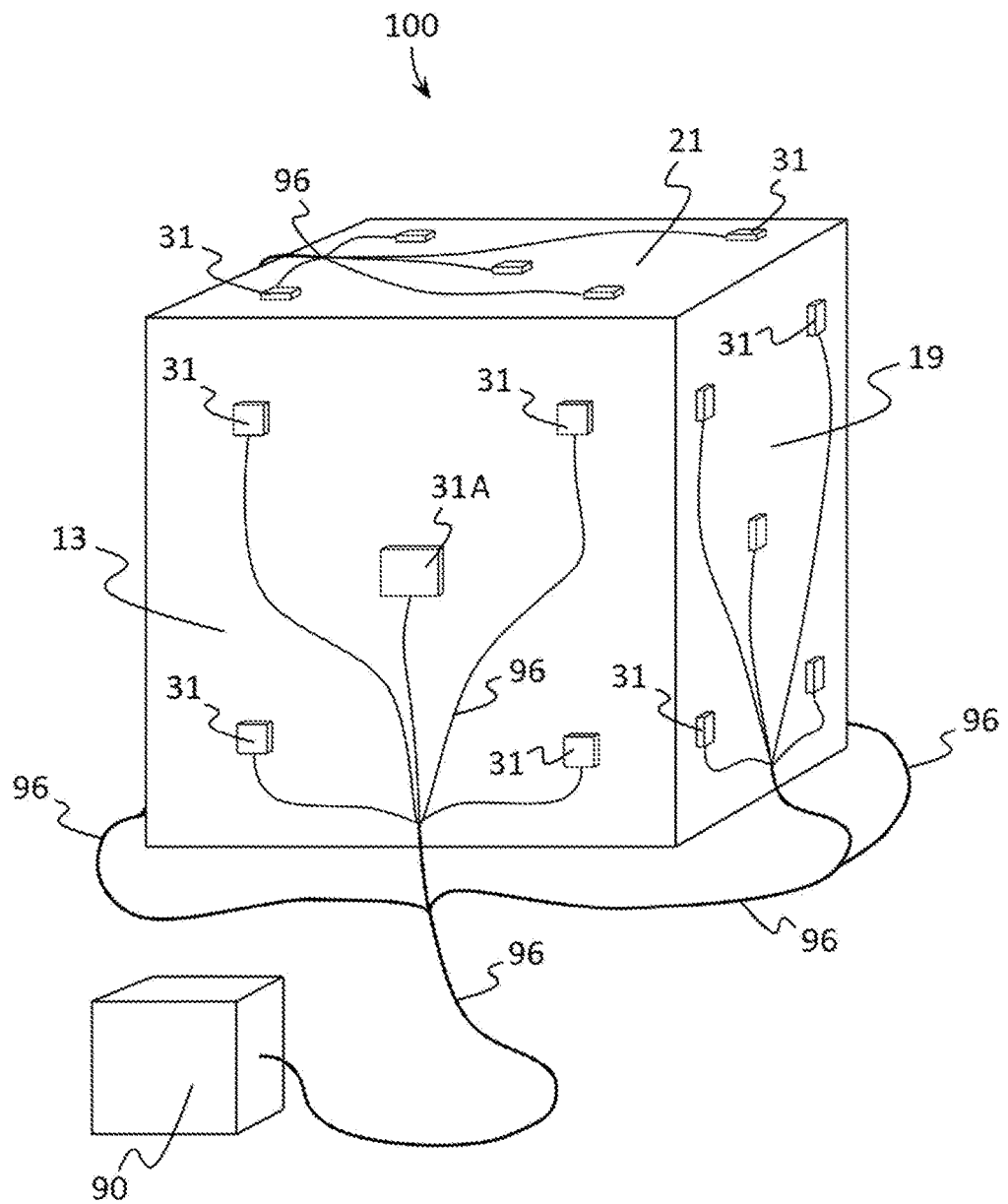
FIG. 13 depicts a perspective view of still a further example of an immersive device according to various embodiments described herein.

FIG. 12 shows a perspective view of still a further example of an immersive device 100 according to various embodiments described herein. In some embodiments, the device 100 may be a portable and may comprise one or more transportation conveyances 41. One or more transportation conveyances 41 may be configured to facilitate the movement of the device 100 across the ground and other surfaces by reducing the friction between the device 100 and the surface over which it is desired to be moved. A transportation conveyance 41 may comprise a wheel, a caster, a tread or track, a low friction pad or bumper, a low friction plate, a ski, a pontoon, or any other suitable device configured to reduce the friction between the device 100 and a surface. In some embodiments, a transportation conveyance 41 may be coupled directly to the floor sidewall 11, while in other embodiments; a transportation conveyance 41 may be coupled to the floor sidewall 11 via a suspension or other element for operably coupling a transportation conveyance 41 to the device 100.

In some embodiments, the device 100 may comprise one or more structural supports 42 to which one or more element of the device 100 may be coupled. For example, the device 100 may comprise a structural support 42 to which the floor sidewall 11 and one or more transportation conveyances 41 may be coupled. In further embodiments, one or more structural supports 42 may be used to position or couple the floor sidewall 11, ceiling sidewall 21, optional door sidewall 23 and/or one or more sidewalls 13, 15, 17, 19, together. In still further embodiments, the device 100 may comprise a towing hitch 43, such as a ball hitch, tow bar, pintle and lunette ring, three-point, fifth wheel, coupling, drawbar, and the like which may facilitate or enable the coupling of the device 100 to a vehicle that may be used to transport the device 100 from one location to another.

While some materials have been provided, in other embodiments, the elements that comprise the device 100 such as the floor sidewall 11, sidewalls 13, 15, 17, 19, ceiling sidewall 21, optional door sidewall 23, optional transportation conveyances 41, optional structural support 42, optional towing hitch 43, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An immersive device, the immersive device comprising:
   a floor sidewall having a floor reflective mirrored surface;
   a first sidewall having a backing coupled to a mirror, the mirror having a first wall reflective mirrored surface, the first sidewall coupled perpendicularly to the floor sidewall;
   a second sidewall having a backing coupled to a mirror, the mirror having a second wall reflective mirrored surface, the second sidewall coupled perpendicularly to the floor sidewall and coupled perpendicularly to the first sidewall;
   a third sidewall having a backing coupled to a mirror, the mirror having a third wall reflective mirrored surface, the third sidewall coupled perpendicularly to the floor sidewall opposite the first sidewall and coupled perpendicularly to the second sidewall;
   a fourth sidewall having a backing coupled to a mirror, the mirror having a fourth wall reflective mirrored surface, the fourth sidewall coupled perpendicularly to the floor sidewall opposite the second sidewall and coupled perpendicularly to both the first sidewall and third sidewall;
   a ceiling sidewall having a backing coupled to a mirror, the mirror having a ceiling reflective mirrored surface, the ceiling sidewall coupled perpendicularly to the first, second, third, and fourth sidewalls and the ceiling sidewall being positioned opposite to the floor sidewall;
   a reflective chamber for receiving an observer, wherein the floor reflective mirrored surface, the first wall reflective mirrored surface, the second wall reflective mirrored surface, the third wall reflective mirrored surface, the fourth wall reflective mirrored surface, and the ceiling reflective mirrored surface form a perimeter of and bound the reflective chamber;
   a plurality of light emitting elements, wherein at least one of the plurality of light emitting elements is configured to emit light into the reflective chamber, wherein the at least one of the plurality of light emitting elements is coupled to an external side of the first wall reflective mirrored surface while an internal side of the first wall reflective mirrored surface is facing the reflective chamber so that the at least one of the plurality of light emitting elements communicates light through the first wall reflective mirrored surface into the reflective chamber;

a processing unit in electrical communication with the plurality of light emitting elements;

a door sidewall configured to transition between an open position allowing access to the reflective chamber and a closed position blocking access to the reflective chamber, and wherein the mirror of the ceiling sidewall is separated from the mirror of the first sidewall by a gap, wherein at least one of the plurality of light emitting elements is positioned outside of the reflective chamber, and wherein at least one of the plurality of light emitting elements is configured to emit light into the reflective chamber through the gap.

2. The immersive device of claim 1, wherein the door sidewall is formed by the fourth sidewall.

3. The immersive device of claim 1, wherein the fourth wall reflective mirrored surface comprises a door reflective mirrored surface, and wherein the door reflective mirrored surface is configured to transition between the open position and the closed position.

4. The immersive device of claim 1, wherein the wall reflective mirrored surfaces are each square shaped having equal dimensions.

5. The immersive device of claim 1, wherein at least one of the light emitting elements is selected from one of a light emitting diode and a laser light emitter.

6. The immersive device of claim 1, further comprising a power supply.

7. The immersive device of claim 6, wherein the power supply is in electrical communication with the plurality of light emitting elements.

8. The immersive device of claim 1, wherein at least one of the light emitting elements is disposed within the reflective chamber.

9. The immersive device of claim 1, wherein at least one of the light emitting elements comprises a display device selected from one of a liquid crystal display (LCD) and an organic light-emitting diode display (OLED).

10. The immersive device of claim 1, further comprising a control input in communication with the processing unit, wherein the control input comprises an electrode configured to contact a portion of a body of the observer.

11. The immersive device of claim 1, wherein at least two of the sidewalls selected from the group consisting of the first sidewall, the second sidewall, the third sidewall, and the fourth sidewall are coupled perpendicular to each other via an angle joint.

12. The immersive device of claim 11, wherein the at least two sidewalls are coupled to the angle joint via a plurality of external fasteners and a plurality of internal fasteners.

13. The immersive device of claim 1, wherein the backing material of at least one of the sidewalls selected from the group consisting of the first sidewall, the second sidewall, the third sidewall, and the fourth sidewall comprises an expansion resistant material that is resistant to moisture induced expansion.

14. The immersive device of claim 1, wherein the backing material of at least one of the sidewalls selected from the group consisting of the first sidewall, the second sidewall, the third sidewall, and the fourth sidewall comprises a honeycomb structure.

15. The immersive device of claim 14, wherein the backing material of at least one of the sidewalls selected from the group consisting of the first sidewall, the second sidewall, the third sidewall, and the fourth sidewall comprises a fiberglass reinforced plastic laminate.

16. An immersive device, the immersive device comprising:

a floor sidewall having a floor reflective mirrored surface;

a first sidewall having a backing coupled to a mirror, the mirror having a first wall reflective mirrored surface, the first sidewall coupled perpendicularly to the floor sidewall;

a second sidewall having a backing coupled to a mirror, the mirror having a second wall reflective mirrored surface, the second sidewall coupled perpendicularly to the floor sidewall and coupled perpendicularly to the first sidewall;

a third sidewall having a backing coupled to a mirror, the mirror having a third wall reflective mirrored surface, the third sidewall coupled perpendicularly to the floor sidewall opposite the first sidewall and coupled perpendicularly to the second sidewall;

a fourth sidewall having a backing coupled to a mirror, the mirror having a fourth wall reflective mirrored surface, the fourth sidewall coupled perpendicularly to the floor sidewall opposite the second sidewall and coupled perpendicularly to both the first sidewall and third sidewall;

a ceiling sidewall having a backing coupled to a mirror, the mirror having a ceiling reflective mirrored surface, the ceiling sidewall coupled perpendicularly to the first, second, third, and fourth sidewalls and the ceiling sidewall being positioned opposite to the floor sidewall;

a reflective chamber for receiving an observer, wherein the floor reflective mirrored surface, the first wall reflective mirrored surface, the second wall reflective mirrored surface, the third wall reflective mirrored surface, the fourth wall reflective mirrored surface, and the ceiling reflective mirrored surface form a perimeter of and bound the reflective chamber;

a plurality of light emitting elements, wherein the mirror of the ceiling sidewall is separated from the mirror of the first sidewall by a gap, wherein at least one of the plurality of light emitting elements is positioned outside of the reflective chamber, and wherein the at least one of the plurality of light emitting elements is configured to emit light into the reflective chamber through the gap;

a processing unit in electrical communication with the plurality of light emitting elements; and a door sidewall configured to transition between an open position allowing access to the reflective chamber and a closed position blocking access to the reflective chamber.

17. The immersive device of claim 16, wherein the backing material of at least one of the sidewalls selected from the group consisting of the first sidewall, the second sidewall, the third sidewall, and the fourth sidewall comprises a moisture induced expansion resistant material.

18. The immersive device of claim 16, wherein the backing material of at least one of the sidewalls selected from the group consisting of the first sidewall, the second sidewall, the third sidewall, and the fourth sidewall comprises a fiberglass reinforced plastic laminate material having a honeycomb structure.

19. The immersive device of claim 16, wherein at least two of the sidewalls selected from the group consisting of the first sidewall, the second sidewall, the third sidewall, and the fourth sidewall are coupled perpendicular to each other via an angle joint, and wherein the at least two sidewalls are coupled to the angle joint via a plurality of external fasteners and a plurality of internal fasteners.

* * * * *